(12) United States Patent
Cosico

(10) Patent No.: US 12,018,912 B2
(45) Date of Patent: Jun. 25, 2024

(54) HANDGUN CASE COMPATIBLE WITH DIFFERENT-SIZE GUNS AND PROVIDING SINGLE-HANDED ACCESS TO AND QUICK-EJECTION OF HANDGUN

(71) Applicant: Carl Gonzaga Cosico, Las Vegas, NE (US)

(72) Inventor: Carl Gonzaga Cosico, Las Vegas, NE (US)

(73) Assignee: Jeannette Box, Las Vegas, NV (US)

( * ) Notice: Subject to any disclaimer, the term of this patent is extended or adjusted under 35 U.S.C. 154(b) by 358 days.

(21) Appl. No.: 17/396,384

(22) Filed: Aug. 6, 2021

(65) Prior Publication Data

US 2022/0042767 A1  Feb. 10, 2022

Related U.S. Application Data

(60) Provisional application No. 63/062,075, filed on Aug. 6, 2020.

(51) Int. Cl.

| *F41C 33/06* | (2006.01) |
|---|---|
| *E05G 1/00* | (2006.01) |
| *G07C 9/00* | (2020.01) |
| *E05G 1/026* | (2006.01) |
| *E05G 1/04* | (2006.01) |
| *G06V 40/12* | (2022.01) |

(52) U.S. Cl.
CPC ............. *F41C 33/06* (2013.01); *E05G 1/005* (2013.01); *G07C 9/00563* (2013.01); *E05G 1/026* (2013.01); *E05G 1/04* (2013.01); *G06V 40/12* (2022.01)

(58) Field of Classification Search
CPC . E05G 1/005; E05G 1/026; E05G 1/04; F41C 33/06; G06V 40/12; G07C 9/00563
See application file for complete search history.

(56) References Cited

U.S. PATENT DOCUMENTS

| 5,161,396 A | * | 11/1992 | Loeff | ................. E05B 47/0002 |
| | | | | 70/279.1 |
| 5,225,612 A | | 7/1993 | Bernkrant | |
| 5,701,770 A | * | 12/1997 | Cook | ..................... E05B 47/02 |
| | | | | 382/124 |

(Continued)

FOREIGN PATENT DOCUMENTS

WO    2009070499 A1    6/2009

*Primary Examiner* — Christopher J Boswell
(74) *Attorney, Agent, or Firm* — Newman LLP

(57) ABSTRACT

In accordance with the embodiments disclosed herein, the present disclosure is related to a storage device for safely securing handguns while simultaneously enabling the handgun user to be immediately armed. Novel features comprise a quick-eject component that requires the user to use only one hand to both open the case and retrieve the gun; a configurable receiver that allows for the case to be compatible with different-size handguns; and an adjustable-tension component that enables configuration of the necessary tension so that the handgun is deployed with only the necessary amount of force. The disclosed storage device is mobile and lightweight and may be opened through various mechanisms, such as a biometric fingerprint reader. Methods for the manufacturing of such storage devices are also disclosed herein.

20 Claims, 14 Drawing Sheets

(56) References Cited

U.S. PATENT DOCUMENTS

| | | | | |
|---|---|---|---|---|
| 6,405,861 B1 * | 6/2002 | Siler | ............... | F41C 33/06 |
| | | | | 206/1.5 |
| 6,570,501 B2 * | 5/2003 | Bushnell | ............. | E05B 47/0603 |
| | | | | 340/5.82 |
| 6,843,081 B1 | 1/2005 | Painter | | |
| 6,918,519 B2 * | 7/2005 | Vor Keller | .......... | E05B 47/0607 |
| | | | | 224/244 |
| 7,434,427 B1 * | 10/2008 | Miresmaili | ............. | F41C 33/06 |
| | | | | 42/70.11 |
| 8,104,313 B2 * | 1/2012 | Wolfe | .................. | A47B 81/00 |
| | | | | 42/70.11 |
| 8,201,426 B2 * | 6/2012 | Heim | .................... | E05G 1/005 |
| | | | | 206/1.5 |
| 8,770,117 B2 * | 7/2014 | Wall | ..................... | E05G 1/024 |
| | | | | 109/74 |
| 9,218,699 B1 * | 12/2015 | McIntyre | ................ | E05G 1/00 |
| 9,340,163 B2 | 5/2016 | Baker | | |
| 9,500,441 B2 | 11/2016 | Kirby, Jr. | | |
| 9,530,266 B2 * | 12/2016 | Delattre | ................ | E05G 1/005 |
| 9,624,711 B2 * | 4/2017 | McAlexander | ......... | E05G 1/026 |
| 10,253,529 B1 * | 4/2019 | McGinn | ................. | E05G 1/005 |
| 10,494,856 B2 | 12/2019 | Bernkrant et al. | | |
| 10,989,496 B2 | 4/2021 | Bernkrant et al. | | |
| 11,092,407 B2 | 8/2021 | Bernkrant et al. | | |
| 2003/0057122 A1 | 3/2003 | Bushnell et al. | | |
| 2015/0129383 A1 | 5/2015 | Kirby, Jr. | | |
| 2018/0073836 A1 | 3/2018 | Romeo et al. | | |
| 2019/0137215 A1 | 5/2019 | Bernkrant et al. | | |

* cited by examiner

HANDGUN CASE COMPATIBLE WITH DIFFERENT-SIZE GUNS AND PROVIDING SINGLE-HANDED ACCESS TO AND QUICK-EJECTION OF HANDGUN

CROSS-REFERENCE TO RELATED APPLICATIONS

This application claims priority and benefit to U.S. Provisional Application No. 63/062,075, filed on Aug. 6, 2020, titled Quick Draw; the contents of which are incorporated herein by this reference as though set forth in their entirety.

FIELD OF USE

The present disclosure relates generally to the field of safely securing, storing, and staging handguns. More specifically, the present disclosure relates to devices and methods for the secure storing of varying-size handguns that is portable, enables access to handguns with the use of a single hand, and immediately ejects the handgun directly into the same hand used for accessing.

BACKGROUND

Handgun owners must often balance the need for quickly accessing their handgun with the need to safely secure, and limit access to, the handgun. This is true for both staging (stored in a ready-to-use condition) and storing guns. (Both staging and storing are interchangeably used herein.) Existing gun-storage products—e.g., trigger locks, gun cabinets, lock boxes, and gun safes—enable gun owners to safely keep guns inaccessible or away from others through various mechanisms or components, such as keylocks, numeric keypads, and biometric readers. But they have significant limitations that prevent quick access to the gun. For example, existing safes accessible by a key require one to pick the right key, insert it into the lock, unlock the lock, open the safe, and then retrieve the gun. Though this process might arguably only take ten seconds or so, the delay can be significant in certain situations. Other products using quicker mechanisms, such as biometric readers, still require the owner to gain access to the safe with one hand and use the other hand to open the safe and/or retrieve the gun within the safe. Such products may require slightly less time to access the gun but are still cumbersome to use and, in a situation where seconds matter, may cause tension and result in more hindrance than assistance in retrieving the gun. Notably, existing products do not account for the varying calibers, sizes, and weights of handguns and as a result, are generic in nature, are compatible with a very-limited selection of guns, and cannot resolve the effects that differing-size guns have on retrievability.

Thus, what is needed are devices that enable a handgun owner to secure a handgun in a manner that is inaccessible to others yet still be able to both access and retrieve the gun in the quickest way possible. To quicken retrievability, such devices will allow for the use of a single hand and will eject the handgun directly into the owner's hand. Such devices will also be configurable for different-size guns—so that ejection of the gun is not too forceful or weak, and to also increase compatibility with varying gun types.

SUMMARY

The following presents a simplified overview of example embodiments in order to provide a basic understanding of some aspects of the invention. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented herein below. It is to be understood that both the following general description and the following detailed description are exemplary and explanatory only and are not restrictive.

In accordance with the embodiments disclosed herein, the present disclosure is related to a storage device (termed herein "case" for ease of reference only) for safely securing handguns while simultaneously enabling the handgun user to be immediately armed. Novel features comprise a quick-eject component that requires the user to use only one hand to both open the case and retrieve the gun; a configurable receiver that allows for the case to be compatible with different-size handguns; and an adjustable-tension component that enables configuration of the necessary tension so that the handgun is deployed with only the necessary amount of force. The disclosed storage device is mobile and lightweight and may be opened through various mechanisms, such as a biometric fingerprint reader. Methods for the manufacturing of such storage devices, and for safely and rapidly ejecting a handgun from a handgun case, are also disclosed herein.

Still other advantages, embodiments, and features of the subject disclosure will become readily apparent to those of ordinary skill in the art from the following description wherein there is shown and described a preferred embodiment of the present disclosure, simply by way of illustration of one of the modes best suited to carry out the subject disclosure. As it will be realized, the present disclosure is capable of other different embodiments and its several details are capable of modifications in various obvious embodiments all without departing from, or limiting, the scope herein.

BRIEF DESCRIPTION OF THE DRAWINGS

The drawings are of illustrative embodiments. They do not illustrate all embodiments. Other embodiments may be used in addition or instead. Details which may be apparent or unnecessary may be omitted to save space or for more effective illustration. Some embodiments may be practiced with additional components or steps and/or without all of the components or steps which are illustrated. When the same numeral appears in different drawings, it refers to the same or like components or steps.

DETAILED DESCRIPTION OF EMBODIMENTS

Before the present devices and methods are disclosed and described, it is to be understood that they are not limited to specific methods, specific components, or to particular implementations. It is also to be understood that the terminology used herein is for the purpose of describing particular embodiments only and is not intended to be limiting. Various embodiments are described with reference to the drawings. In the following description, for purposes of explanation, numerous specific details are set forth in order to provide a thorough understanding of one or more embodiments. It may be evident, however, that the various embodiments may be practiced without these specific details. In other instances, well-known structures and devices are shown in block diagram form to facilitate describing these embodiments.

Figure 1:
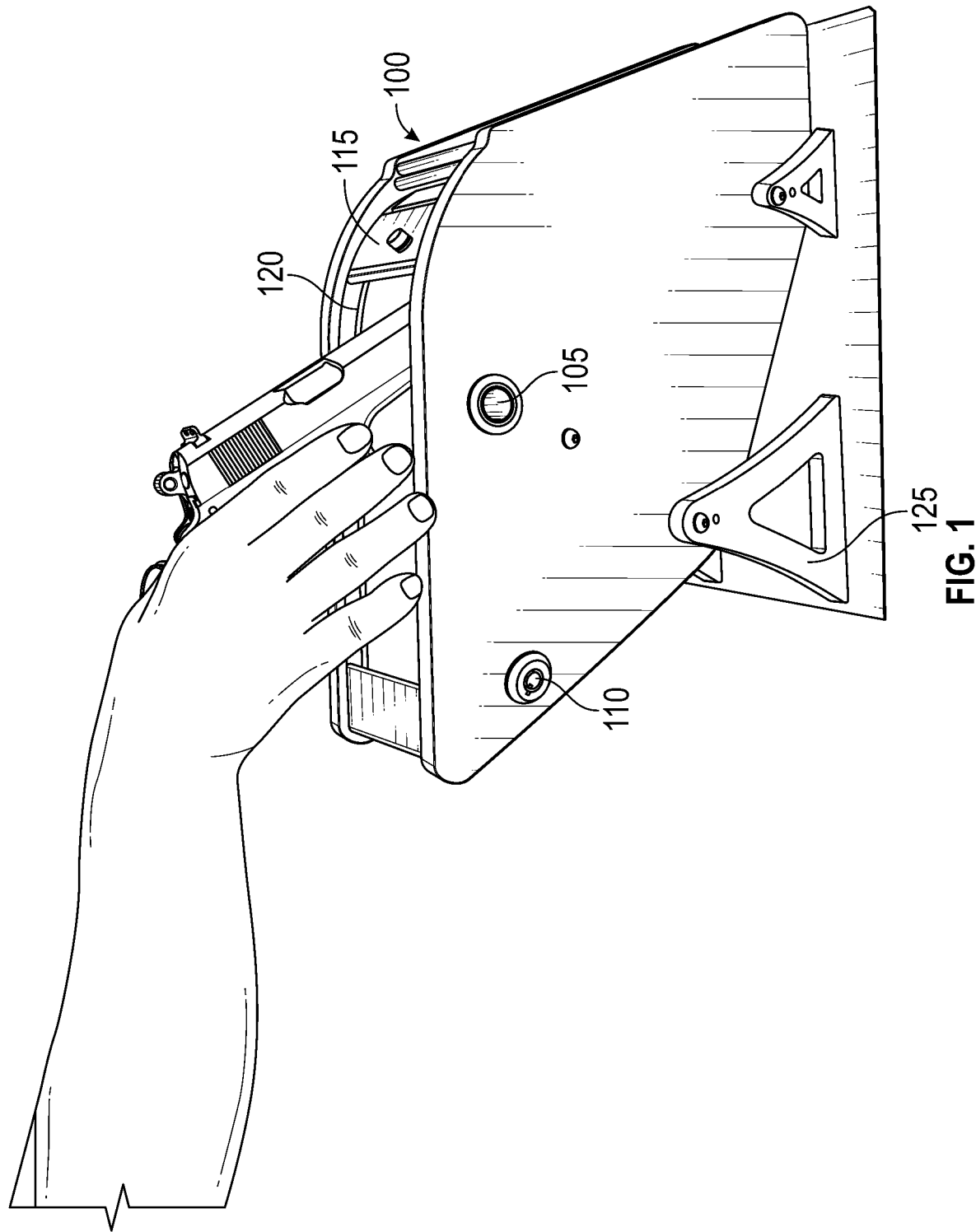
FIG. 1 generally illustrates an embodiment of a handgun case as disclosed herein.

FIG. 1 generally illustrates an embodiment of a handgun case as disclosed herein. In a preferred embodiment, a handgun case 100 may be a size sufficient to store a single handgun while maintaining a size that is discreet and allows for mobility of the case 100. In other embodiments, the disclosed handgun case may vary in size. As shown in FIG. 1, the handgun case 100 may comprise primary and secondary authorization components for opening the case 100, such as a biometric fingerprint reader 105 serving as the primary component and a keylock 110 serving as a secondary, and/or backup, component. When an individual places a finger on the fingerprint reader 105 and the fingerprint is authorized, a door 115 of the case 100 automatically retracts and a quick-ejection component 120 residing within the case 100 is triggered and immediately deploys a handgun into the user's hand. FIG. 1 shows that the hand used to access the case 100 through the fingerprint reader 105 is the same hand into which the gun is deployed.

The ability of a user to open the case with one hand and have the gun immediately deployed into that hand is a novel feature and an improvement upon existing products. Likewise, the speed in which the user is able to access the gun—no more than 1-2 seconds—makes this handgun case unique and provides a significant improvement upon existing products. Also novel: The case 100 is mobile and can be placed in a variety of desired settings, such as by the bed, in a living room, and in a car. For example, the case 100 may further comprise a base stand 125 that allows for the case 100 to stand upright at home. The base stand 125 may be removable such that the case 100 may be installed directly in a car or in any other setting where the base stand 125 is or is not needed.

Figure 2:
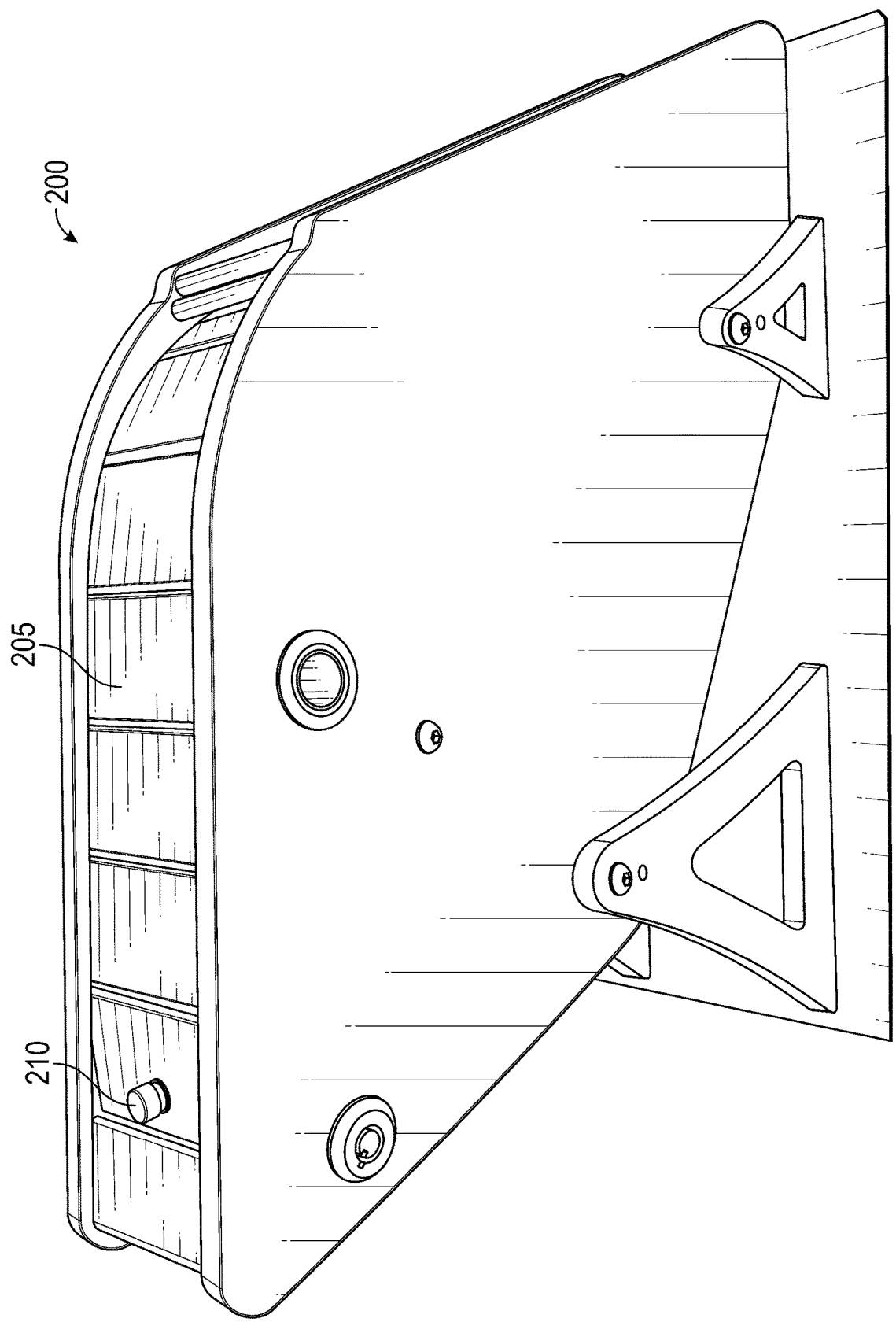
FIG. 2 generally illustrates an embodiment of a handgun case as disclosed herein.

FIG. 2 generally illustrates an embodiment of a handgun case as disclosed herein. As shown in FIG. 2, a handgun case 200 comprises a door 205. In a preferred embodiment, the door 205 is retractable, such that when it is opened or unlocked, it retracts into the case 200. But other embodiments may comprise doors that do not retract into the case but nonetheless can immediately open without obstructing deployment of the gun or the user's access to the case or gun. As is also shown in FIG. 2, the door 205 may comprise a knob 210 to manually close the door 205. Whether the knob 210 makes up an embodiment, the door 205 may still be movable between an open position and a closed position. The door 205 is connected to an authorization component for opening the door 205. For example, when the fingerprint reader identifies an authorized fingerprint, the door 205 will automatically open. Other authorization components for authorizing and allowing access to the case and gun comprise: a keylock; multiple mechanical buttons that require a specific simultaneous selection of more than one of the buttons; a keypad; and non-fingerprint biometric readers.

Figure 3:
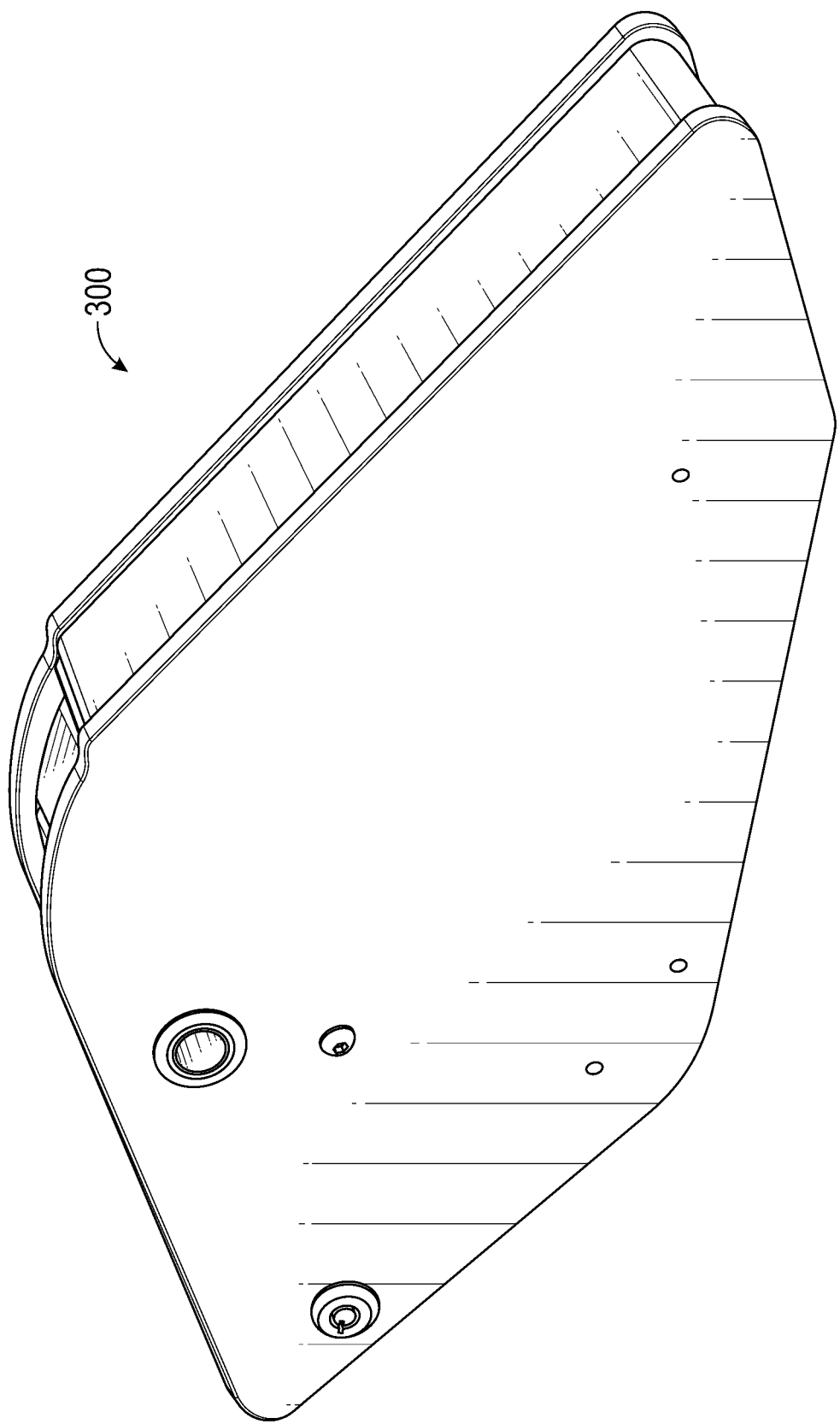
FIG. 3 generally illustrates an embodiment of a handgun case as disclosed herein.

FIG. 3 generally illustrates an embodiment of a handgun case as disclosed herein. As shown in FIG. 3, a handgun case 300 may be standalone and not comprise a base stand 125 or similar mounting brackets. This allows the case 300 to be erected in at least two different positions: the lower position shown in FIG. 3 and the upright position shown in FIG. 2—thus enabling the case 300 to be versatile. For example, if placed on a table, wall unit, or desk (at arm's reach), the case 300 may be set to the lower position to allow for easier access to the gun. If placed on the floor next the sofa or bed, or under the desk, the case may be set to a high (upright) position to allow a more convenient and easier access to the firearm.

Figure 4:
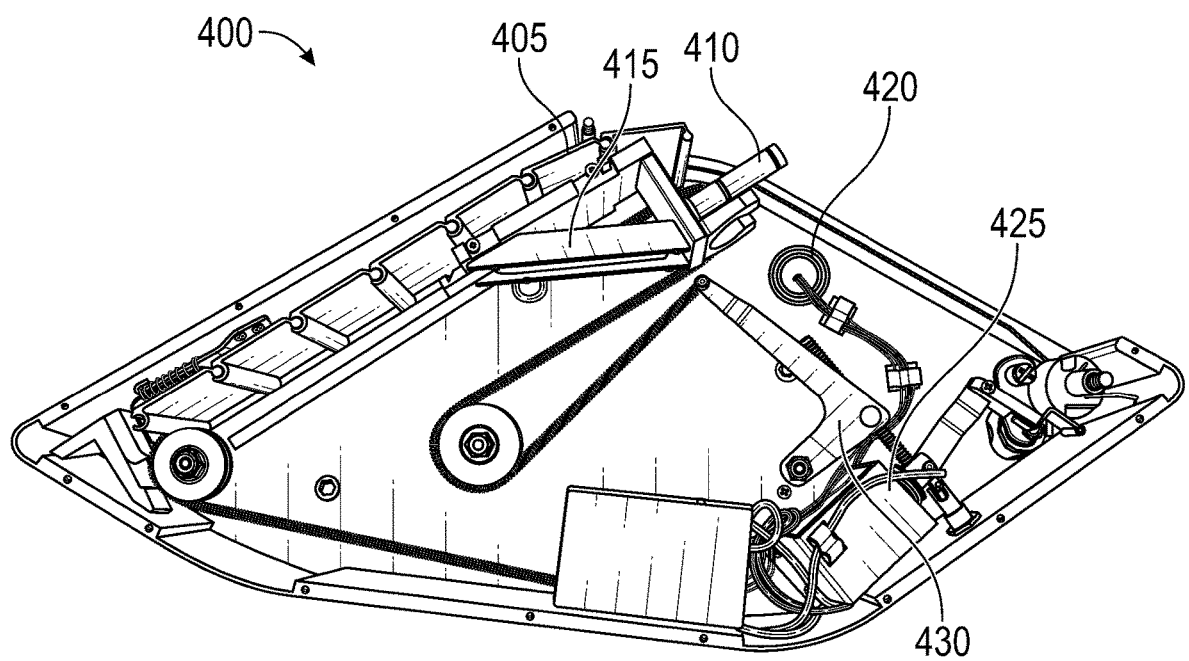
FIG. 4 generally illustrates an embodiment of a handgun case as disclosed herein.

FIG. 4 generally illustrates an embodiment of a handgun case as disclosed herein. Specifically, FIG. 4 illustrates the components that provide the novel features of a single-hand use, quick-eject case 400 that is compatible with different-size handguns. The case 400 may comprise a retractable door 405, a handgun-receiver component 410, a handgun-ejection component 415, an authorization component 420, a door-controller component 425, and a handgun-tensioner component 430.

In one embodiment, a case 400 has a handgun inside of it with the door 405 closed. The handgun-receiver component 410 maintains the gun in place so that it does not move and keeps the gun in a ready-to-deploy position. The case 400 has a fingerprint scanner as an authorization component 420, which scans the fingerprint of an individual to verify that the individual is authorized to access the case 400. Upon positive verification by the authorization component 420, the door-controller component 425 releases the closed door 405, which automatically retracts into the housing of the case 400. Once the door 405 is fully retracted, the handgun-ejection component 415 is released. Once released, the handgun-ejection component 415 carries the handgun-receiver component 410—and the gun positioned in it—out in the direction of the opening. Based on the tension that was preset using the handgun-tensioner component 430, the handgun-ejection component 415 pushes out the handgun-receiver component 410 with enough force to deploy the gun into the individual's hand, without the force being so much that the gun cannot be caught or controlled by the individual.

Figure 5A:
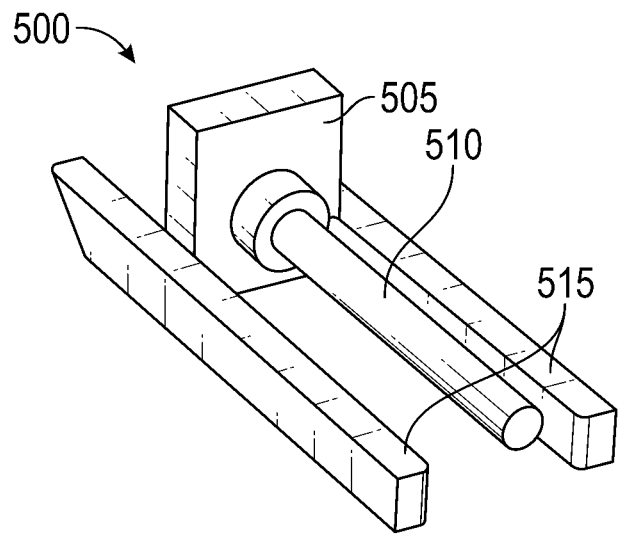
FIG. 5A generally illustrates an embodiment of a handgun-receiver component of a handgun case as disclosed herein.

FIG. 5A generally illustrates an embodiment of a handgun-receiver component of a handgun case as disclosed herein. In one embodiment, the handgun-receiver component 500 comprises a flat surface 505, a barrel pin 510, and a barrel saddle 515. The barrel pin 510 and barrel saddle 515 are used to stabilize and maintain the handgun in place, regardless of whether the handgun is armed or disarmed and regardless of whether the case is open or closed. The barrel of the gun is placed over the barrel pin 510 and the barrel of the gun rests on the barrel saddle 515. The barrel pin 510 may be removable from the flat surface 505 of the handgun-receiver component 500 such that the barrel pin 510 is interchangeable. In one embodiment, the barrel pin 510 may have a threaded portion and be screwed onto the flat surface 505, or in another embodiment, may be popped into the flat surface 505 via male-female connector ends. This novel feature—of having interchangeable barrel pins 510—improves existing products by enabling the disclosed handgun case to be compatible with various-size handguns.

Figure 5B:
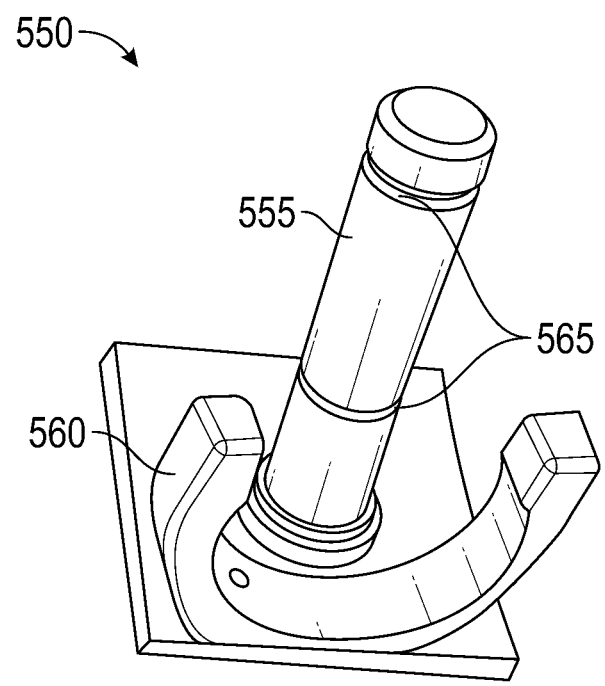
FIG. 5B generally illustrates an embodiment of a handgun-receiver component of a handgun case as disclosed herein.

FIG. 5B generally illustrates an embodiment of a handgun-receiver component of a handgun case as disclosed herein. When compared to FIG. 5A, the handgun-receiver component 550 in FIG. 5B comprises a barrel pin 555 and barrel saddle 560 that are different in dimensions and features than those in FIG. 5A but which nonetheless serve the same function. For example, the embodiment shown in FIG. 5B comprises a barrel pin 555 with O-rings 565 (to protect the gun barrel) and comprises a round-shaped barrel saddle 560.

Figure 6:
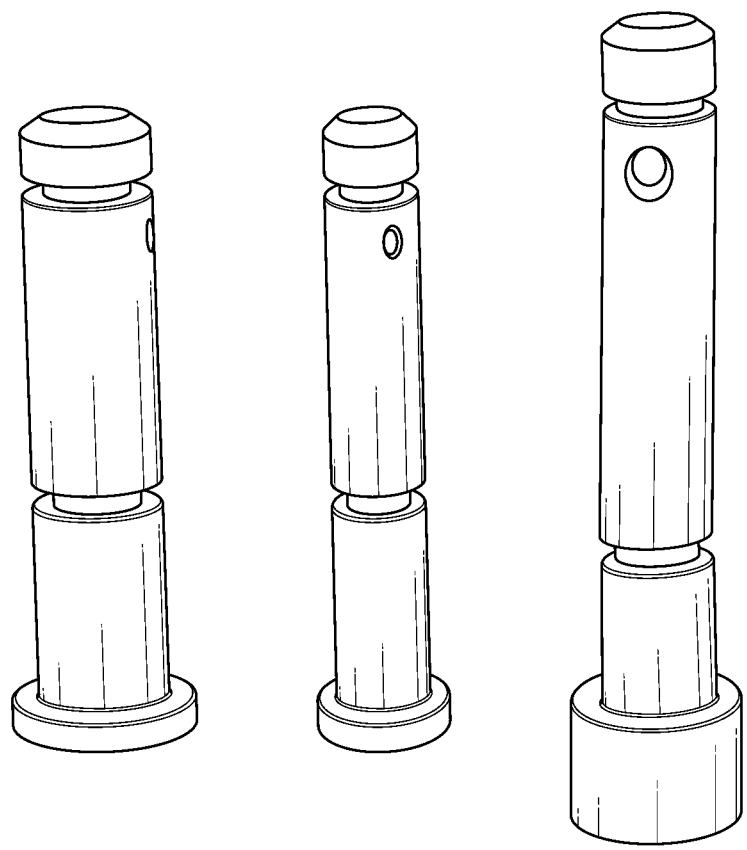
FIG. 6 generally illustrates an embodiment of a barrel pin of a handgun-receiver component as disclosed herein.

FIG. 6 generally illustrates an embodiment of a barrel pin of a handgun-receiver component as disclosed herein. Barrel pins may vary in size such that they are compatible with the barrel size (sometimes referred to as the "caliber of the gun") of the handgun. The varying-size barrel pins are interchangeable to ensure that users can use the same handgun case for different-size handguns without having to purchase separate cases for the different guns. For example, a handgun may range in size from 0.380 to 0.45 caliber. As shown in FIG. 6, barrel pins may be manufactured in at least three different sizes. Prior to storing the handgun in the case, the barrel-pin size compatible with the handgun may be attached to the flat surface of a handgun-receiver component. For example, a 9 mm (millimeter) pistol would require a 9 mm-size barrel pin. Yet the same user may also own a 0.45-caliber handgun and so would also want the 0.45-size barrel pin.

Figure 7:
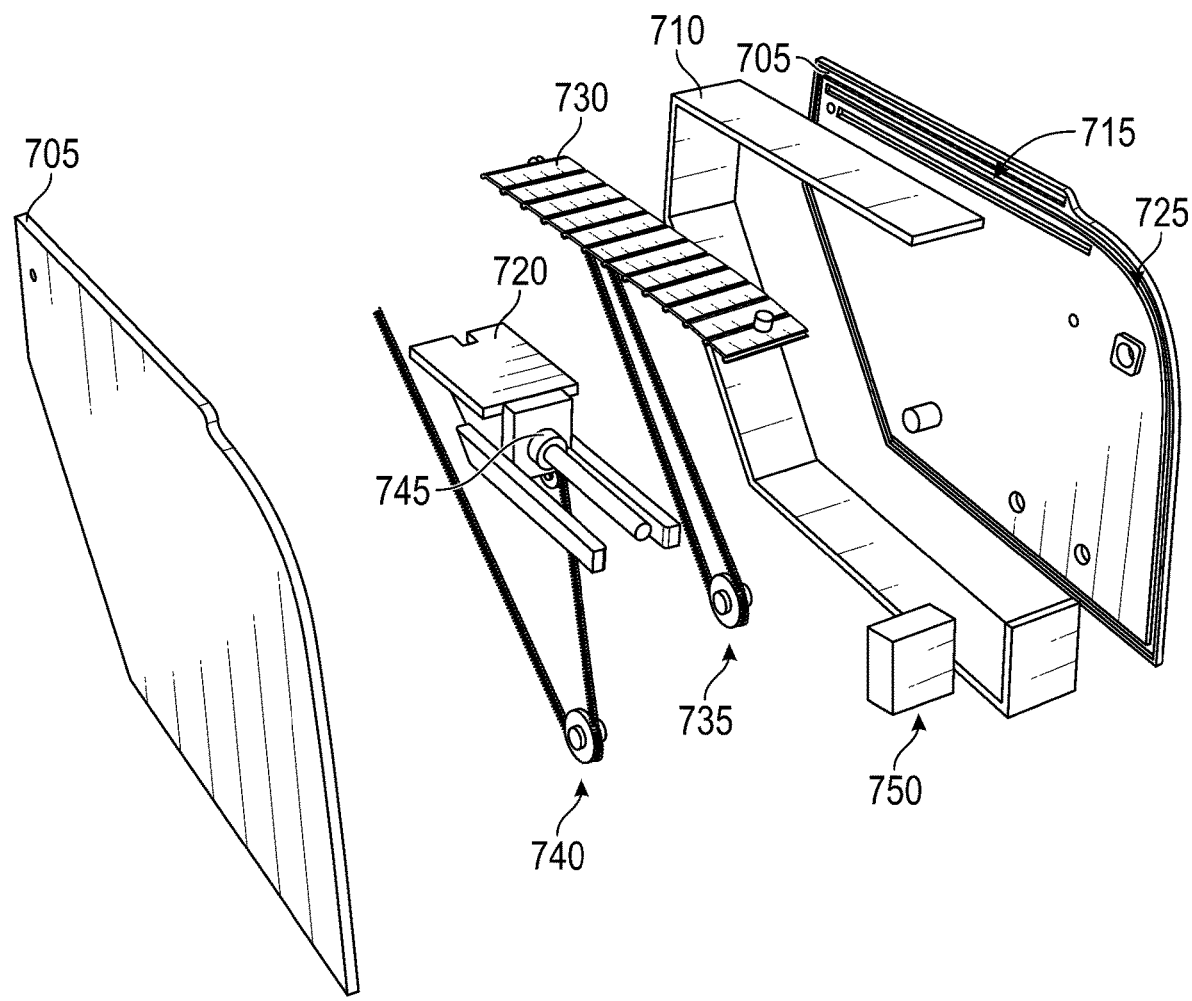
FIG. 7 generally illustrates an embodiment of a handgun-receiver component of a handgun case as disclosed herein.

FIG. 7 generally illustrates an embodiment of a handgun case as disclosed herein. As shown in FIG. 7, a handgun case may comprise two outer walls 705 and a side wall 710 connecting together the two outer walls 705. The outer walls 705 may comprise a groove 715 through which a handgun-ejection component 720 will travel and/or a groove 725 through which a door 730 will travel. In other embodiments, instead of grooves as shown in FIG. 7, the door 730 and/or handgun-ejection component 720 may travel through a track. For example, a track may be welded onto the outer walls 705 in place where the grooves 715 and/or 725 are positioned. Or the door 730 and handgun-ejection component 720 may travel on bearings on either the grooves or tracks. The door 730 may be operable through a pulley component 735, wherein once an authorization component confirms authorized access, the pulley component 735 pulls the door 730 back, causing it to retract back into the case along the groove 725. Similarly, the handgun-ejection component 720 may also be operable through a pulley component 740. The handgun-ejection component 720 may have a handgun-receiver component 745 attached to it, such that when the door 730 fully retracts, the handgun-ejection component 720, together with the handgun-receiver component 745, is triggered to slide forward along the track 715 through the use of the pulley component 740. The case may also comprise a stop block 750, wherein the stop block 750 acts as a cushion and serves the purpose of softening, or lessening, the force with which the door may close against the bottom of the case. And the case may further comprise a spring component positioned near the top of the opening such that when the door fully opens, the spring component lifts the door up a sufficient amount (~a quarter of an inch) such that the handgun-ejection component may retract back into the case after the gun is deployed.

Other embodiments may comprise alternative components similar to the pulley components. For example, the handgun-ejection component and the door may be operable through gear components, wheel-and-axle components, a screw jack component, or levers—all of which may be motorized. These embodiments are likely much slower in opening the door and deploying the handgun but can still accomplish the novel features.

Figure 8:
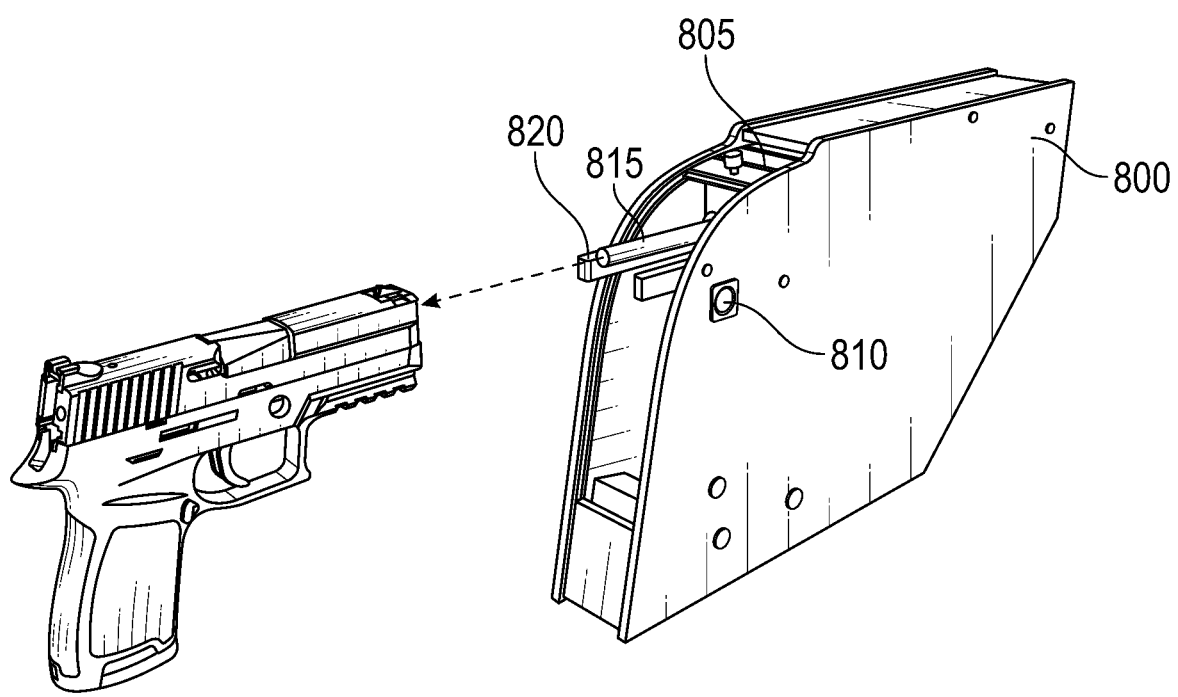
FIG. 8 generally illustrates an embodiment of a handgun-receiver component of a handgun case as disclosed herein.

FIG. 8 generally illustrates an embodiment of a handgun case as disclosed herein. As shown in FIG. 8, the door 805 of a handgun case 800 may be opened through the use of a biometric fingerprint reader 810. In one embodiment, the biometric fingerprint reader 810 is an electronic component powered by a battery. It may also be plugged into an outlet, such as a cigarette lighter or a 110-volt transformer. The biometric reader 810 may accommodate and store in its memory multiple different fingerprints. Generally speaking, right-handed users will scan their forefinger or middle finger, and left-handed users will scan their thumb (though any finger may be used regardless of the dominant hand).

FIG. 8 also shows how the case 800 deploys the handgun once the door 805 is opened. Prior to deployment, the gun resides in the case 800 and is mounted on the barrel pin 815 and barrel saddle 820 of a handgun-receiver component. With the handgun-receiver component attached to a handgun-ejection component, when the door is opened, the handgun-ejection component slides forward towards the opening and deploys the gun out of the case 800 and into a user's hand.

As shown in FIG. 8, the handgun-ejection component may be positioned to move toward the opening of the case when the door is in the open position. This may be the result of the pulley component moving the handgun-ejection component toward the opening, or through any component that can cause the handgun-ejection component to move back and forth.

Figure 9B:
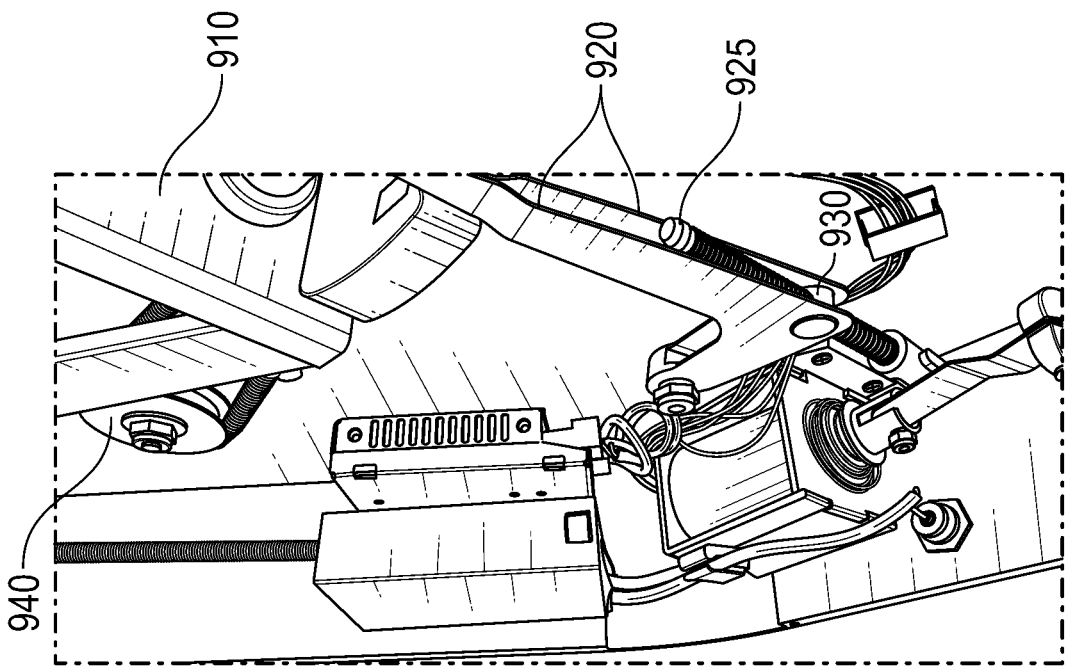
FIGS. 9A and 9B generally illustrate an embodiment of a handgun case as disclosed herein.
Figure 9A:
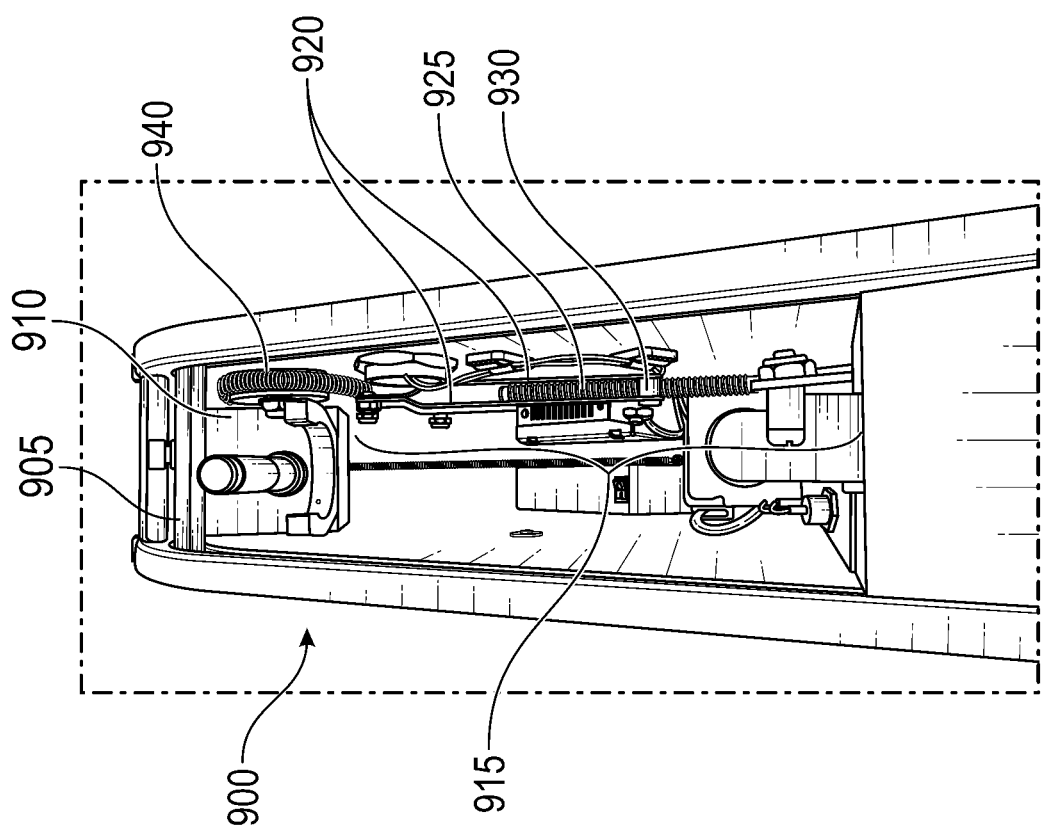

FIGS. 9A and 9B generally illustrate an embodiment of a handgun case as disclosed herein. Shown in FIGS. 9A and 9B is a handgun case 900 with the door 905 open and the handgun-receiver component 910 in a position ready to receive a handgun. Also shown in FIGS. 9A and 9B is the handgun-tensioner component 915. The handgun-tensioner component 915 allows a user to adjust the tension with which the gun is deployed by the handgun-ejection component.

In one embodiment, the handgun-tensioner component 915 comprises an arm 920 and a threaded bolt 925. The threaded bolt is in between two walls, or sides, of the arm 920 and connected to the arm 920 with a bridging element 930. The threaded bolt 925 extends parallel to the outer walls, with the top of the threaded bolt 925 ending below the top of the arm 920, and the bottom of the threaded bolt 925 extending to either the side wall or outer wall, wherein the threaded bolt 925 is accessible by a user and can be turned to adjust the height of the arm 920. The top of the arm 920 of the handgun-tensioner component 915 is connected to the handgun-ejection component through a pulley system 940. The bottom of the handgun-tensioner component 915 is connected to the side wall. Because the handgun-tensioner component 915 is connected to the handgun-ejection component through the pulley system 940, when the height of the handgun-tensioner component 915 is raised or lowered, the tension on the pulley system 940 is also loosened or tightened, such that it creates or releases tension on the handgun-ejection component. The heavier the gun, the tighter the threaded bolt 925 of the handgun-tensioner component 915 will have to be so that the handgun-ejection component—with the handgun-receiver component attached to it—raises the gun in a position ready for deployment. This novel feature—an adjustable tensioner—enables the disclosed handgun case to be compatible with varying sizes and weights of guns. The handgun-tensioner component 915 may be adjusted so that a heavier gun will have more force—more tension in the pulley system—so that it can be deployed directly into a user's hand.

Figure 10:
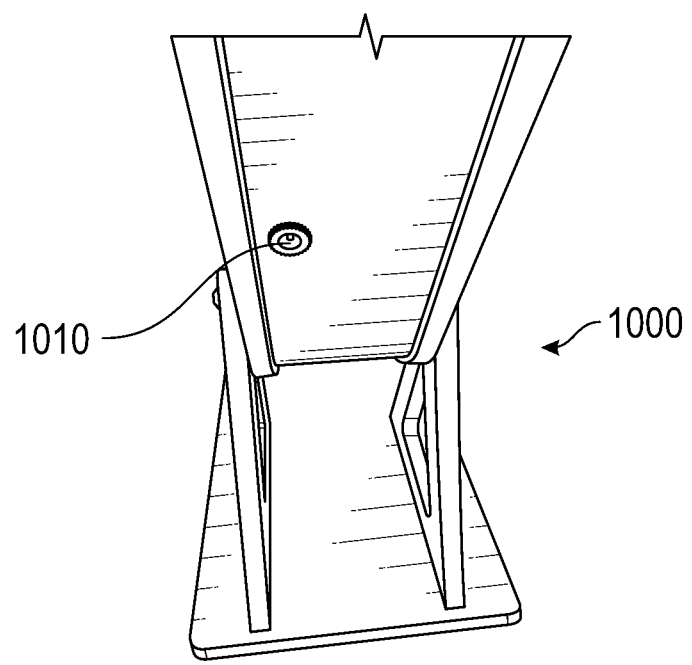
FIG. 10 generally illustrates an embodiment of a handgun case as disclosed herein.

FIG. 10 generally illustrates an embodiment of a handgun case as disclosed herein. Shown in FIG. 10 is a handgun case 1000 with an opening 1010 wherein a threaded bolt of a handgun-tensioner component is accessible for the purpose of adjusting the tension on a handgun-ejection component that is connected to the handgun-tensioner component. This novel feature enables a user to adjust the tension according to the size and/or weight of the handgun to be stored in the case.

Figure 11:
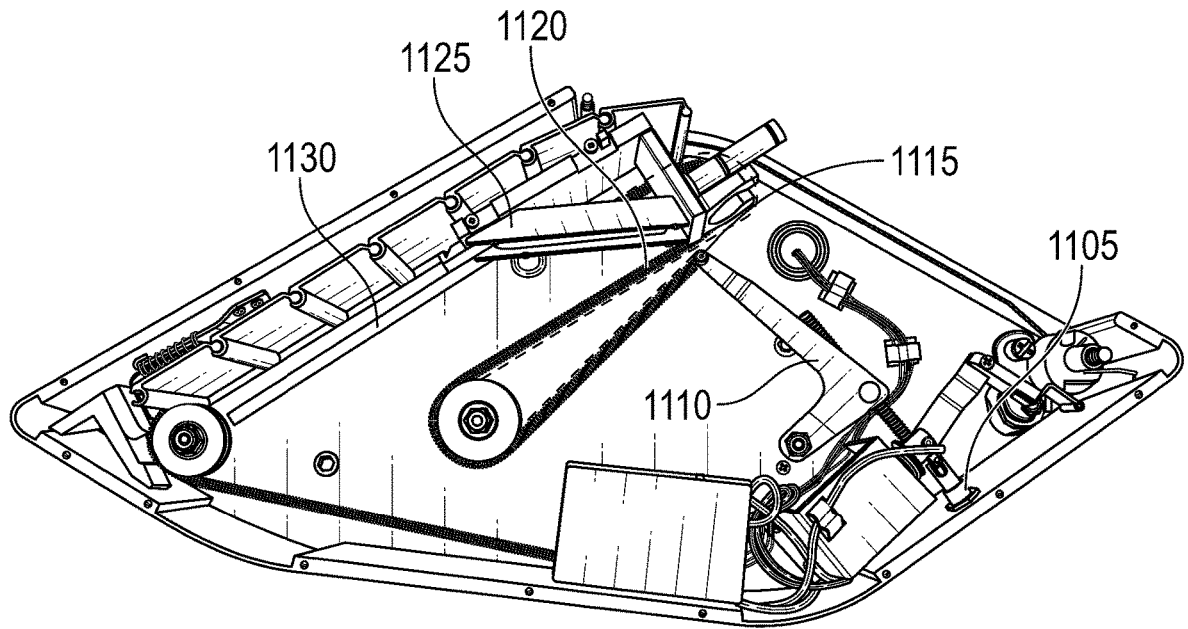
FIG. 11 generally illustrates an embodiment of a handgun case as disclosed herein.

FIG. 11 generally illustrates an embodiment of a handgun case as disclosed herein. Shown in FIG. 11 are the mechanisms that enable the handgun-tensioner component 1110 to work in connection with the handgun-ejection component 1125 to deploy a handgun with the necessary amount of force required. The handgun-tensioner component 1110 comprises an adjustable component 1105 that allows the height of the handgun-tensioner component 1110 to be adjusted as the user desires. The top of the handgun-tensioner component 1110 is connected to a pulley system 1120 (also represented by the dotted line). The height of the handgun-tensioner component 1110 causes the tension on the pulley system 1120 to increase and decrease (e.g., to be adjusted according to the varying weights of different handguns). The pully system 1120 is connected to the handgun-ejection component 1125, such that the increased or decreased tension on the pulley system 1120 has a direct effect on the force with which the handgun-ejection component 1125 travels along the groove 1130 out towards the opening.

Figure 12:
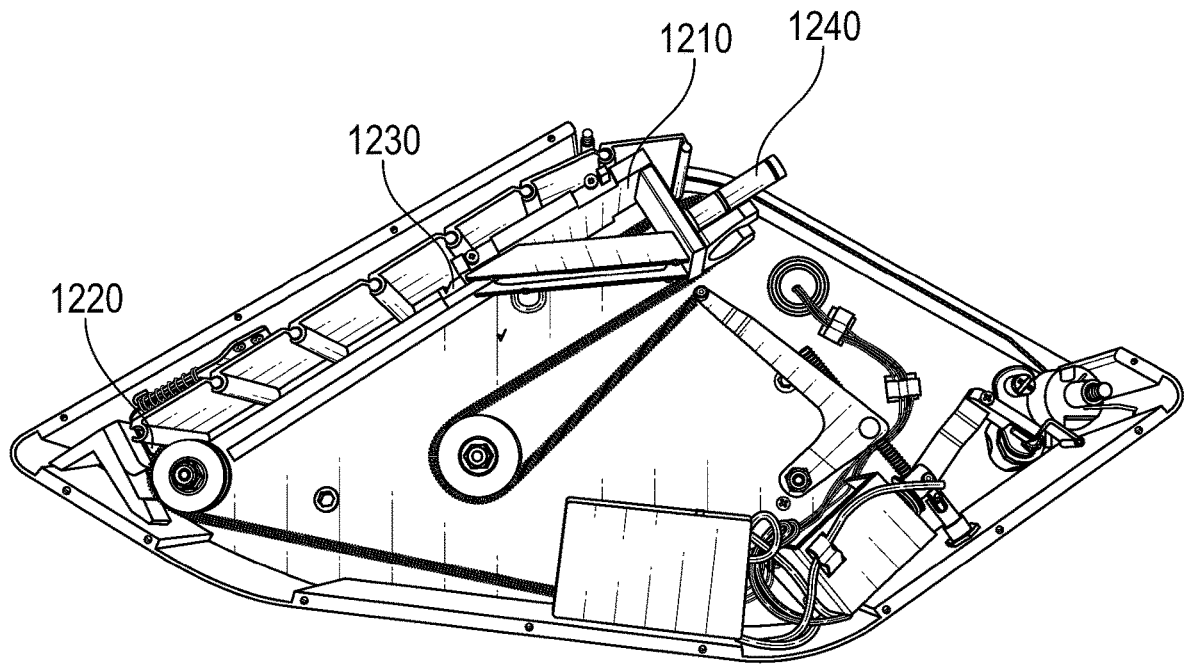
FIG. 12 generally illustrates an embodiment of a handgun case as disclosed herein.

FIG. 12 generally illustrates an embodiment of a handgun case as disclosed herein. The opening of the door of a handgun case causes the handgun-ejection component 1210 to be released and deploy the handgun. In a preferred embodiment, this is carried out through the use of locking component, comprising a latch 1220 connected to the wall of the case and suspended above the door, and a divet 1230 within the handgun-ejection component 1210. When the case has a gun inside of it and is closed, the latch 1220 rests within the divet 1230, thus securely keeping the handgun-ejection component 1210 in place. When the door fully retracts it collides with and raises the latch 1220, which disconnects from the divet 1230, causing the handgun-ejection component 1210 to be released and the gun—held in place by the handgun-receiver component 1240, which is attached to the handgun-ejection component 1210—to be deployed.

Through the pulley components, or similar corresponding embodiments, and the latch 1220 and divet 1230, a handgun may be inserted into the handgun case by inserting the barrel over the barrel pin and exerting force against the handgun, thus pushing the handgun-receiver and handgun-ejection components into the inside of the case. Once the divet 1230 of the handgun-ejection component passes under the latch 1220, the handgun-ejection component is locked in place and the handgun may be kept inside the case.

Figure 13:
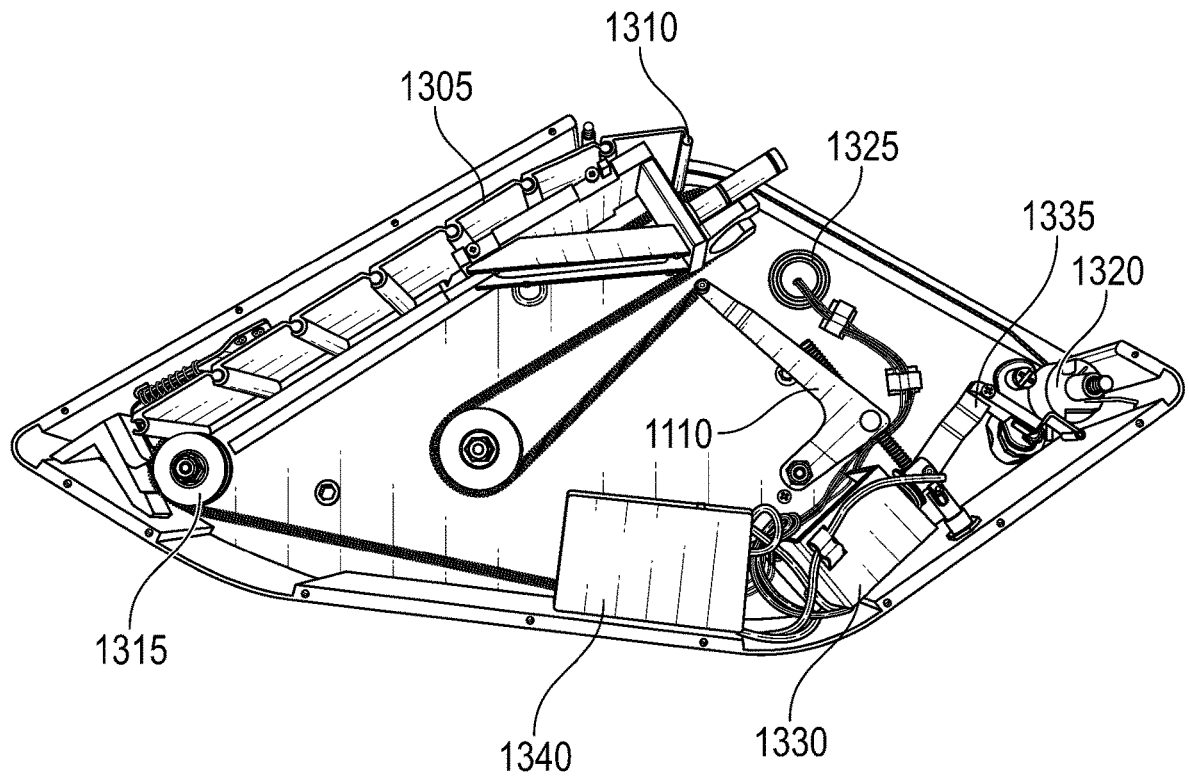
FIG. 13 generally illustrates an embodiment of a handgun case as disclosed herein.
Figure 14:
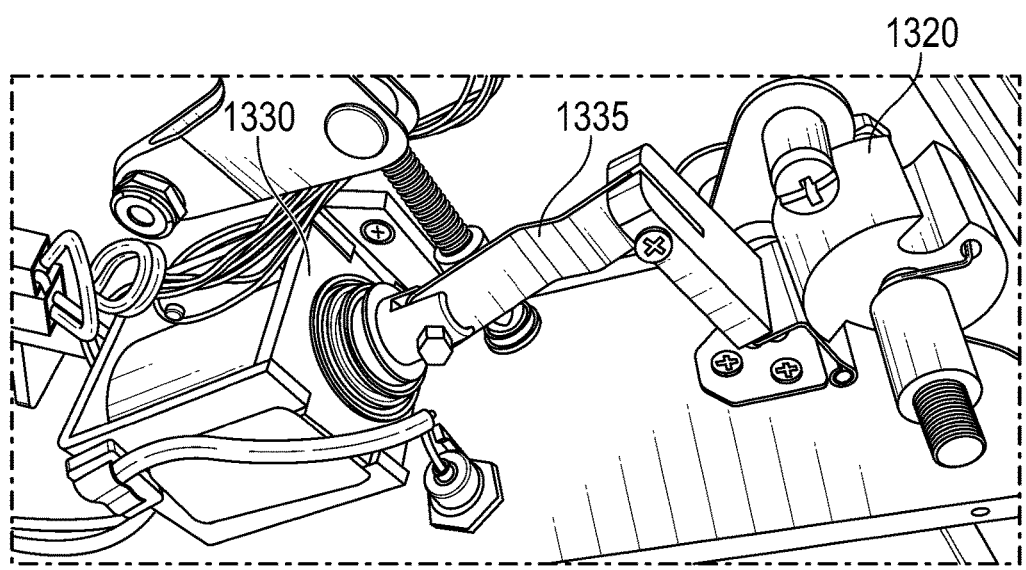
FIG. 14 generally illustrates an embodiment of a handgun case as disclosed herein.

FIGS. 13 and 14 generally illustrates an embodiment of a handgun case as disclosed herein. As shown in FIG. 13, a door 1305 of a handgun case may be opened and kept closed through the use of a locking component comprising a ridge 1310 at the end of the door 1305 and a door latch 1320 within which the ridge 1310 is inserted into to keep the door 1305 in a closed position. Other embodiments may comprise a deadbolt component or a pin-and-receiver component that also lock the door 1305 in place.

In one embodiment, when the fingerprint scanner 1325 authorizes accessibility, it causes a solenoid 1330 to move a lever 1335 that rotates the door latch 1320 in a manner that releases the ridge 1310, causing the door 1305 to open and be retracted through a pulley component 1315. Other embodiments of the solenoid 1330 comprise a microprocessor that controls the level 1335, door latch 1320, or similar locking components, with the microprocessor communicating with the fingerprint scanner (or other authorization components) for the purpose of receiving input from the scanner to confirm that access to the case is authorized.

Also shown in FIG. 13 is a backup battery 1340. The backup battery 1340 can provide either primary or auxiliary power to the handgun case. For example, the case may receive power through a cigarette lighter connection or be plugged directly into a power outlet. In such instances, the backup battery 1340 can provide secondary power to the case should the primary power source be inoperable or inaccessible.

Figure 15:
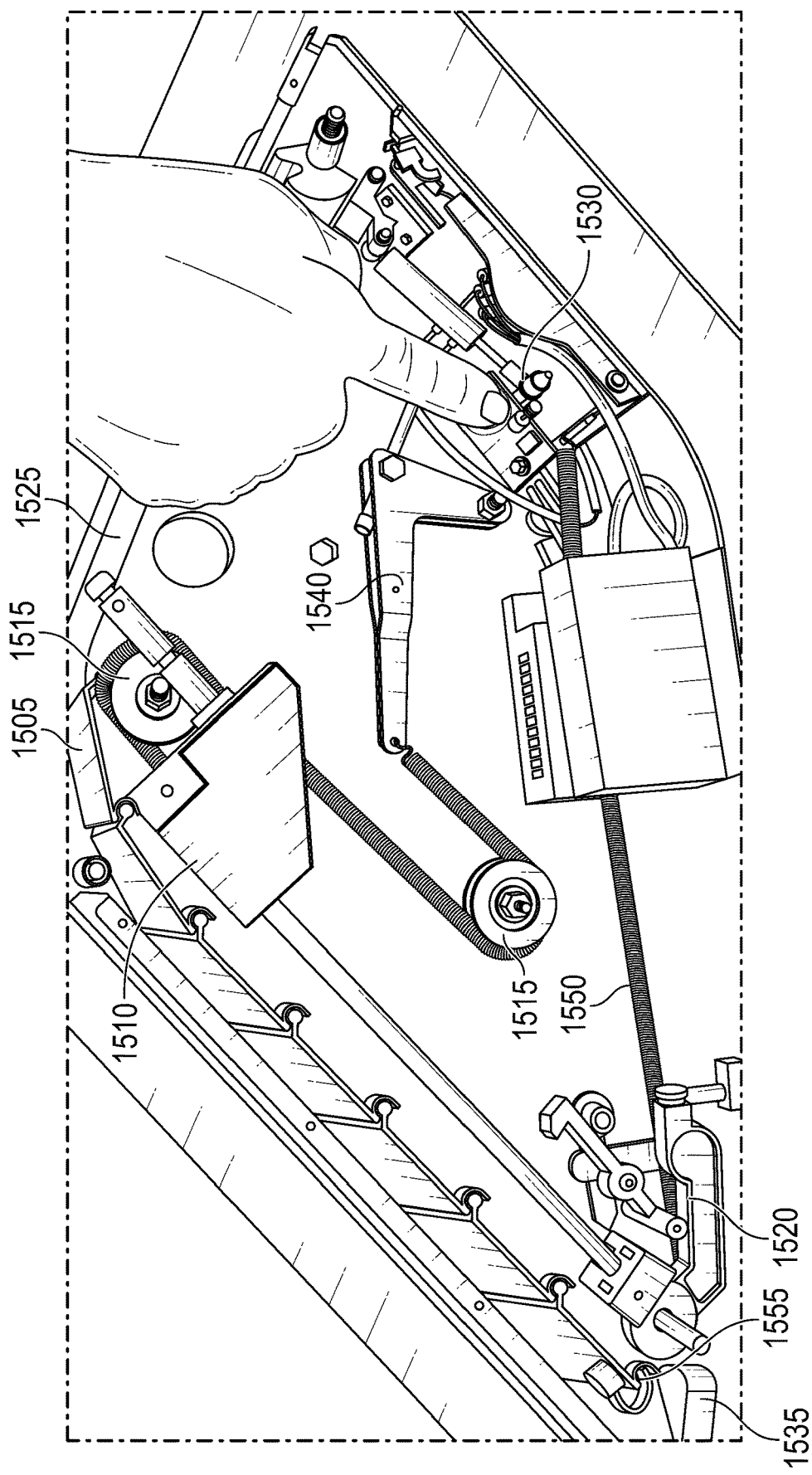
FIG. 15 generally illustrates an embodiment of a handgun case as disclosed herein.

FIG. 15 generally illustrates an embodiment of a handgun case as disclosed herein. Similar to the figures above, the handgun case may include a gun carrier assembly (described further with regard to FIG. 16 below), which assembly may include a handgun-ejection component 1510. Some handgun case embodiments may also include various other components, such as a gun carrier lock mechanism 1520 and a handgun-tensioner component 1540 (similar in some respects to handgun-tensioner component 1110 as described with regard to FIG. 11 above).

In some embodiments, a user may perform an action to commence the process of opening the door 1505 of the handgun case. For example, the commencing action may include the user entering a combination, registering a biometric match, and/or pressing a button, etc. (at e.g., a biometric reader located partially underneath the hand, and more particularly, the thumb shown, and towards the perimeter of the handgun case, and near to a proximate end of the door 1505 next to the biometric reader when the door 1505 is in a closed position).

In some examples, the commencing action may eventually lead to the door 1505 opening (e.g., by triggering one or more additional actions). In some embodiments, this may be accomplished by the commencing action resulting in first, the activation of a motor 1530. In turn, the activating or energizing of the motor 1530 may trigger one or more additional actions, such as releasing a door locking mechanism. In some embodiments, such releasing may occur by the motor 1530 (which in some examples may be an electric Servo motor bolted to the interior side of one or both sidewalls of the handgun case) pulling a tie rod, which in turn may pull the door locking mechanism, causing the door 1505 (in a closed position, which is not shown) to unlock.

With the door 1505 thus unlocked, or as the door locking mechanism releases (or in addition to such releasing), certain other actions may be triggered so that the door 1505 may be opened. In some embodiments this may be accomplished by the activating of the motor 1530 also triggering an extension spring component 1550 to pull the handgun case door 1505 rapidly in a direction away from an opening 1525. More specifically, in some embodiments, such movement of the door 1505 away from the opening may be achieved by an extension spring component 1550 causing a pulley system to engage. For example, the extension spring component 1550 may have an end proximate to the motor 1530, and an opposite end towards the gun carrier locking mechanism. That opposite end, in the illustration shown, may be run though and engageable with a pulley and connected to a distal end 1555 of the door 1505. Thus, the activated motor 1530 may trigger the extension spring component 1550 to exert a force, via in part the pulley, which may rapidly pull back the distal end of the door 1505 (towards the pulley), thereby opening the door 1505, and revealing the opening 1525. The opening 1525 may expose the receptacle formed by the interior walls of the handgun case, which receptacle may have inside a handgun (not shown) placed on the handgun-ejection component 1515, thus exposing the handgun to the opening 1525.

When the door 1505 fully retracts so as to expose the opening 1525, a distal end 1555 of the door 1505 may hit a contact point triggering release of the gun carrier locking mechanism 1520. The release of the gun carrier locking mechanism 1520 may in some embodiments involve the retraction of a hook from hooking the handgun-ejection component 1515, thus unlocking and/or freeing it and any handgun thereon to move towards the opening 1525.

Such movement towards the opening may be achieved, in some embodiments, by another (or another part of the) pulley system. For example, some pulley system embodiments may include a spring tension adjuster 1540 (which may be similar in some respects to the handgun-tensioner component 1110 of FIG. 11), which may be connected to one end of a spring component. That spring component, in some embodiments, may run through or engage with one or more pulley components 1515 (such as two pulley components 1515 shown), and then attach on an opposite end to the gun-ejection component 1520.

In some embodiments, prior to the commencing action and the eventual release of the gun carrier locking mechanism 1520, the aforementioned spring running though and/or engaging with the pulley components 1515 may be in a state of constant tension. But the release of the gun carrier locking mechanism may cause the tension state of the spring to suddenly change and retract.

In some embodiments, this releasing of the spring's tension may in turn result trigger movement of the gun ejection component 1510, and ejection of the handgun. For instance, in the embodiment illustrated, the pulley system may have a pulley component 1515 located above the handgun-ejection component 1510—where "above" may refer to being located at least partially between the handgun-ejection component 1510 and the opening 1525 (and/or the door 1505 when in the closed position).

In some examples, the pulley system through the pully components 1515, and in some aspects as described above and elsewhere in the disclosure, may apply a pulling force pulling the handgun-ejection component 1510 toward the opening 1525. In such a manner, a handgun placed on and/or secured to the handgun-ejection component 1510 may be ejected toward and through the opening 1525 (or at least some portion of the handgun, such as the handle or grip may be ejected toward and through the opening 1525). In some examples, all the above steps from the commencing action to the ejection of the handgun may by highly coordinated and occur in rapid succession, and nearly instantaneously, and may entail a high degree of consistency in operations, with a very low failure rate.

In some examples, such consistency, reliability, and smooth operating may be further refined using handgun case components designed or configured to control with more precision the various forces acting on the handgun case, and to decrease the volume of related sounds. For instance, some embodiments may include a component to absorb or soften the impact of the door 1505 opening. By way of more specific example, a cushion foam 1535 may be secured towards the distal end (away from the opening 1525) of the door 1505 and configured to soften the impact of the door 1505 as it opens and slides or moves away from the opening 1525 and towards and impacts the cushion foam 1535, thereby reducing associated noise (for example, resulting from the momentum of the door 2005 hitting an interior wall of the handgun case).

Figure 16:
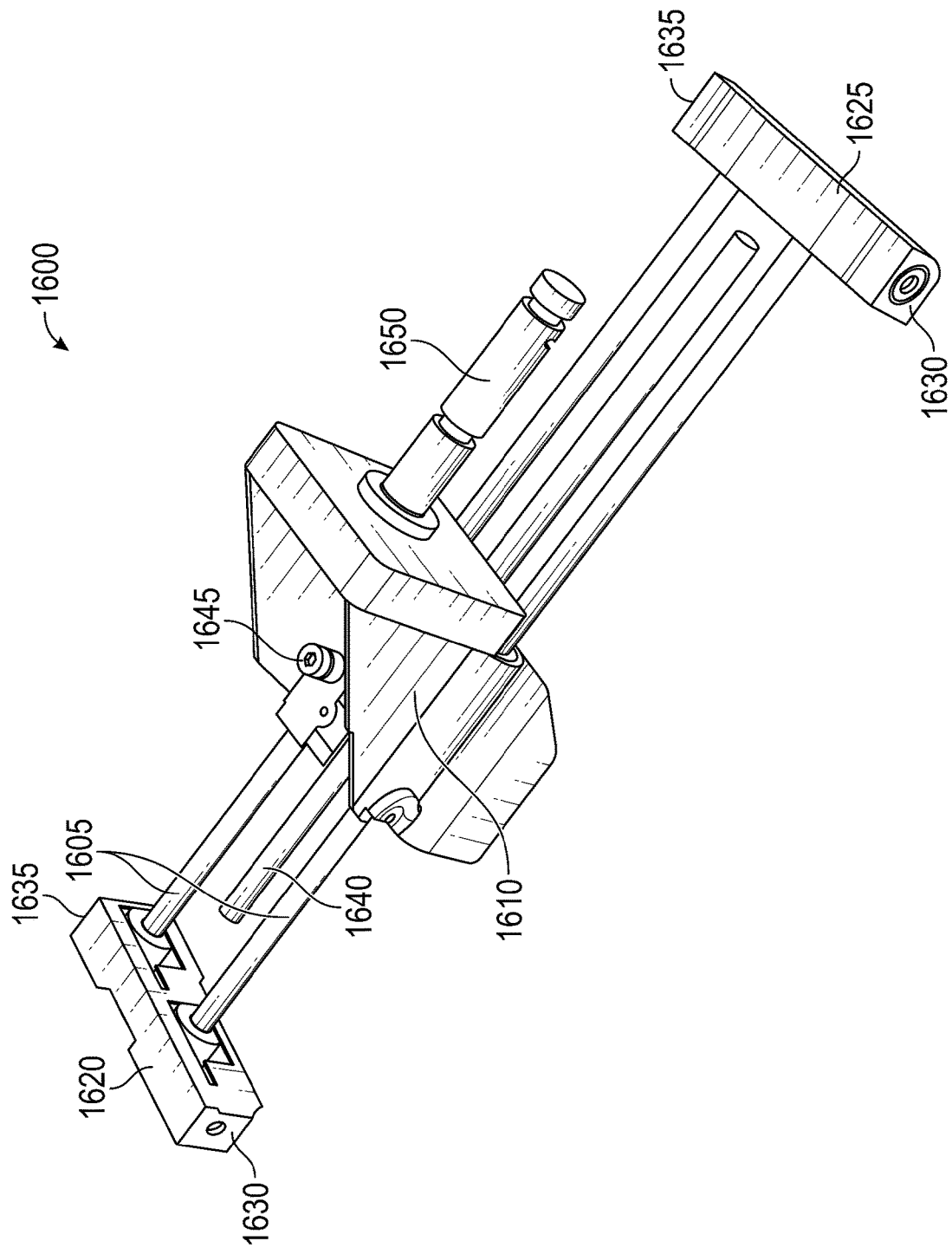
FIG. 16 generally illustrates an embodiment of a handgun-receiver component of a handgun case as disclosed herein.

FIG. 16 generally illustrates an embodiment of a handgun-receiver component of a handgun case as disclosed herein. As shown in FIG. 16, another component to control various forces may be a gun carrier assembly 1600, which may include a handgun-ejection component 1610.

In some embodiments, the handgun-ejection component 1610 may be movably or slidably connected or fastened to a rail system. In some examples, the rail system may include two rails 1605. In some examples, the two rails 1605 may ride on linear bearings that ride on two linear shafts. In some examples, the rail system may operate within a linear rail housing. In some embodiments, the linear rail housing may include end blocks 1620, 1625 located on opposite sides of the handgun-ejection component 1610, and on opposite ends of the rails 1605. Each end block 1620, 1625 have opposite securement ends 1630, 1635, which in some embodiments may be configured to secure or attach (for example, by being bolted) to the interior sides of opposite walls of the handgun case.

Some rail system examples (e.g., that feature a such a "rail track" design as described above) may allow greater accuracy and/or predictability in performance of the handgun-ejection component 1610. For example, the rail system may be made from materials (e.g., non-plastic polymer material) less affected by temperature changes (e.g., which might otherwise result in bearings shrinking and constricting).

Some gun carrier assembly 1600 embodiments may also include of break or dampener 1640. The dampener 1640 may be configured to control the ejection velocity of the handgun-ejection component 1610. The dampener 1640 may prevent an undesirably fast ejection of a handgun. For instance, too fast of an ejection velocity may entail the handgun ejecting from the handgun case entirely, making the handgun difficult to handle by a user. The gun carrier assembly 1600 may further include an adjustment component 1645 (e.g., as a knob), to adjust the amount of dampening caused by the dampener 1640, for example according to handgun weight.

In some embodiments, the handgun-ejection component 1610 may also include an adjustable and/or replaceable barrel pin 1650. For example, the barrel pin 1650 may be replaceable by pins of other sizes (e.g., with dimensions corresponding to the barrels diameters of different handguns), which may be similar in some respect to barrel pin 510 described above with regard to FIG. 5A.

The disclosed handgun case may be made of a variety of materials, such as plastic or metal such as aluminum or carbon steel. In a preferred embodiment, the outer and side walls are made of ABS plastic so as to be more durable, longer lasting, and impact- and heat-resistant.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Throughout the description and claims of this specification, the word "comprises" and variations of the word, such as "comprising" and "comprises," means "including but not limited to," and is not intended to exclude, for example, other components, integers, or steps. "Exemplary" means "an example of" and is not intended to convey an indication of a preferred or ideal embodiment. "Such as" is not used in a restrictive sense, but for explanatory purposes.

Disclosed are components that may be used to perform the disclosed devices and methods. These and other components are disclosed herein, and it is understood that when combinations, subsets, interactions, groups, etc. of these components are disclosed, that while specific reference of each various individual and collective combinations and permutation of these may not be explicitly disclosed, each is specifically contemplated and described herein, for all methods and systems. This applies to all embodiments of this application including, but not limited to, steps in disclosed methods. Thus, if there are a variety of additional steps that may be performed it is understood that each of these additional steps may be performed with any specific embodiment or combination of embodiments of the disclosed methods.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure.

Unless otherwise stated, all measurements, values, ratings, positions, magnitudes, sizes, locations, and other specifications that are set forth in this specification, including in the claims that follow, are approximate, not exact. They are intended to have a reasonable range that is consistent with the functions to which they relate and with what is customary in the art to which they pertain.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

What is claimed is:

1. A handgun storage case, comprising:
    a door, wherein the door is movable between an open position and a closed position;
    a biometric reader, configured to authorize access to the handgun storage case while a hand is positioned at the door when movable between the closed position and the open position; and
    a handgun-ejection component, wherein the handgun-ejection component comprises a pulley component and a handgun-receiver component;
    wherein the handgun-receiver component comprises a flat surface, a barrel pin connected to the flat surface, and a barrel saddle connected to the flat surface and positioned below the barrel pin;
    wherein the handgun-ejection component is positioned to move toward an opening of the handgun storage case when the door is in the open position, and wherein the pulley component moves the handgun-ejection component toward the opening to deploy a gun positioned on the handgun-ejection component into the hand of a user positioned at the door when the biometric reader authorizes access and when the door is movable between the closed position and the open position without the door obstructing deployment of the gun to the hand.

2. The handgun storage device of claim 1, wherein the barrel pin is detachably connected to the flat surface.

3. The handgun storage device of claim 2, further comprising a handgun-tensioner component, wherein the handgun-tensioner component comprises an arm, wherein a top end of the arm is connected to the pulley component and a bottom end of the arm is connected to a rod, wherein the rod is connected to a wall of the handgun storage device.

4. The handgun storage device of claim 3, wherein the rod is a threaded bolt and wherein an end of the rod protrudes out of the wall of the handgun storage device.

5. The handgun storage device of claim 1, further comprising a second pulley component connected to the door.

6. The handgun storage device of claim 1, wherein the biometric reader is a fingerprint biometric reader.

7. The handgun storage device of claim 6, further comprising:
    a lock-and-release component for locking the door; and
    a microprocessor, wherein the microprocessor is connected to the fingerprint biometric reader and to the lock-release-component.

8. The handgun storage device of claim 6, wherein access to the handgun storage case comprises the door moving from the closed position to the open position, and wherein the fingerprint biometric reader is configured to authorize access by placement of a finger thereon, wherein the finger is of the hand at the door when movable between the closed position and the open position.

9. The handgun storage device of claim 1, further comprising one or both of a battery and a key lock.

10. The handgun storage device of claim 1, wherein the barrel saddle is distinct from the flat surface.

11. A method for a quick-eject handgun case, comprising:
a biometric reader of the handgun case authorizing access to the handgun case while a hand of a user is positioned at a door of the handgun case, wherein the door is movable from a closed position to an open position;
in response to the biometric reader authorizing access, the door moving from the closed position to an open position; and
in response to the door moving from the closed position to the open position, a handgun-ejection component deploying a gun thereon out of the handgun case into the hand of the user positioned at the door since the biometric reader authorized access without the door obstructing deployment of the gun to the hand, wherein the handgun-ejection component comprises a pulley component and a handgun-receiver component;
wherein the handgun-receiver component comprises a flat surface, a barrel pin connected to the flat surface, and a barrel saddle connected to the flat surface and positioned below the barrel pin;
wherein the handgun-ejection component is positioned to move toward the door opening of the handgun storage case and wherein the pulley component moves the handgun-ejection component toward the opening.

12. The method of claim 11, wherein the barrel pin is detachably connected to the flat surface.

13. The method of claim 12, further comprising a handgun-tensioner component, wherein the handgun-tensioner component comprises an arm, wherein a top end of the arm is connected to the pulley component and a bottom end of the arm is connected to a rod, wherein the rod is connected to a wall of the handgun storage device.

14. The method of claim 13, wherein the rod is a threaded bolt and wherein an end of the rod protrudes out of the wall of the handgun storage device.

15. The method of claim 11, further comprising a second pulley component connected to the door.

16. The method of claim 11, wherein the biometric reader is a fingerprint biometric reader.

17. The method of claim 16, further comprising:
a lock-and-release component for locking the door; and
a microprocessor, wherein the microprocessor is connected to the fingerprint biometric reader and to the lock-release-component.

18. The method of claim 16, wherein the fingerprint biometric reader is configured to authorize access by placement of a finger thereon, wherein the finger is of the hand at the door when movable between the closed position and the open position.

19. The method of claim 11, further comprising one or both of a battery and a keylock.

20. The method of claim 11, wherein the barrel saddle is distinct from the flat surface.

* * * * *